United States Patent [19]
Zijp et al.

[11] 3,742,109
[45] June 26, 1973

[54] PROCESS FOR THE PREPARATION OF HIGH-MOLECULAR POLYMERIZATION PRODUCTS

[75] Inventors: Jan W. H. Zijp; Hendrik Bosch; Antonius Stevenhagen, all of Geleen, Netherlands

[73] Assignee: Stamicarbon N.V., Heerlen, Netherlands

[22] Filed: Oct. 21, 1970

[21] Appl. No.: 82,728

Related U.S. Application Data

[63] Continuation-in-part of Ser. No. 750,741, Aug. 6, 1968, abandoned.

[30] Foreign Application Priority Data

Aug. 9, 1967  Netherlands................. 6710935

[52] U.S. Cl.............. 264/311, 264/297, 264/334, 264/DIG. 56, 425/435, 425/436
[51] Int. Cl.............................................. B29c 5/04
[58] Field of Search.............. 264/334, 336, 297, 264/310–311, DIG. 56; 18/26 RR; 25/41 H, 41 C, 30 C; 425/435–436

[56] References Cited
UNITED STATES PATENTS

| | | | |
|---|---|---|---|
| 2,693,007 | 11/1954 | Rhodes | 264/328 |
| 3,309,439 | 3/1967 | Nonweiler | 264/311 |
| 3,448,086 | 6/1969 | Bachman et al. | 264/311 |
| 2,454,847 | 11/1948 | Slack, Jr. | 264/311 |
| 3,164,654 | 1/1965 | Spencer | 264/311 |

FOREIGN PATENTS OR APPLICATIONS 1,217,590  5/1966  Germany................. 264/311

*Primary Examiner*—Donald J. Arnold
*Assistant Examiner*—Gene Auville
*Attorney*—Cushman, Darby & Cushman

[57] ABSTRACT

A process for producing polymers by the ionogenic polymerization of lactams is disclosed, wherein the lactam monomer, in the liquid state, mixed with a catalyst and promoter is introduced into a heated mold, which rapidly rotates about an axis outside the mold, via a conduit disposed co-axially with respect to the axis and via a feed channel which extends from the conduit at an angle to the axis and the polymerized, molded object is automatically removed from the mold in a radial direction due to centrifugal force.

6 Claims, 8 Drawing Figures

Patented June 26, 1973

INVENTORS
JAN W. H. ZIJP
HENDRIK BOSCH
ANTONIUS STEVENHAGEN

BY Cushman, Darby & Cushman
ATTORNEYS

Patented June 26, 1973 3,742,109

INVENTORS
JAN W. H. ZIJP
HENDRIK BOSCH
ANTONIUS STEVENHAGEN

By Cushman, Darby & Cushman
ATTORNEYS

PROCESS FOR THE PREPARATION OF HIGH-MOLECULAR POLYMERIZATION PRODUCTS

CROSS-REFERENCE TO RELATED APPLICATION

This is a continuation-in-part application of our earlier United States patent application, Ser. No. 750,741, filed Aug. 6, 1968 now abandoned.

BACKGROUND OF THE INVENTION

The preparation of high-molecular weight polymerization products by ionogenic polymerization of lactams, in a process wherein a mixture of monomer, catalyst and promoter is introduced into a heated polymerization mold, is known to the art.

In such a process the volume of the material in the mold decreases considerably, and it is consequently difficult when producing a series of objects in the same mold to obtain molded objects having the same dimensions. Another disadvantage is that during the shrinkage of the material, a partial vacuum is produced in the mold, as a result of which, air may be drawn in which may cause oxidation with consequent discoloration of the surface of the molded object. In most instances it is therefore necessary to maintain a nitrogen atmosphere around the mold during the polymerization step.

It has previously been suggested to effect the polymerization reaction partly outside the polymerization mold, so that shrinkage inside the mold is reduced. This method has the disadvantage however that the viscosity of the reaction liquid increases substantially during the pre-polymerization step, and may become so high due to the rapid action of the promoter, that the liquid becomes unsuitable to completely fill the polymerization mold, and/or air cannot escape quickly enough from the mold.

SUMMARY OF THE INVENTION

The polymerization mold for lactam polymerization is rapidly rotated about an axis disposed outside the mold, and during rotation the lactam to be polymerized is introduced into the mold by a conduit disposed coaxially with respect to the axis, and by a feed channel which extends from the conduit at an angle to the axis. The centrifugal force exerted on the lactam, which is in the liquid phase and contains a catalyst and a promoter, is considerably larger than the force of gravity, thus allowing the mold to be completely, filled and vented, with compensation for polymerization shrinkage. The polymerized, molded object is then automatically removed from the mold in a radial direction due to centrifugal force.

DETAILED DESCRIPTION OF THE INVENTION

According to the present invention, the mold is rapidly rotated about an axis disposed outside the mold and during this rotation the material to be polymerized is introduced into the mold via a conduit disposed coaxially with respect to said axis and via a feed channel which extends from the conduit at an angle to the axis. Preferably the feed channel is radially or substantially radially connected to said conduit, although it is only necessary that the feed channel projects from the conduit. Upon completion of the polymerization reaction, the mold may be stopped and the polymerized, molded object removed therefrom. Preferably, however, the mold is opened during the rotation of the molds with the aid of suitable means as known in the art, whereby the molded object is thrown out of the mold by centrifugal force, and caught; whereupon, the mold is then closed and a further molded object produced.

During the filling of the rotating mold, the centrifugal force acting on the mold contents is generally considerably greater than the force of gravity, and as a result the mold is completely filled and properly vented. The decrease in volume of the material which occurs during the polymerization step is compensated for by the fact that notwithstanding increase in viscosity of the polymerization mixture, the reaction liquid in the feed channel, due to the large centrifugal force exerted on it, fills up the shrinkage void as it is formed.

Molded objects produced by the process of the present invention are very homogeneous throughout their mass, and in series production there will be hardly any differences in dimensions between successive objects produced from the same mold. Furthermore, due to the fact that no air is drawn into the mold during the polymerization step, there is no discoloration of the surface of the molded object, and consequently there is no need to effect the polymerization in an inert atmosphere.

The material to be polymerized is preferably supplied at a temperature which is lower than the temperature of the mold wall, preferably at least 20° C. below the mold wall temperature, whereby polymerization starts near the said wall and progresses towards the center of the filled mold. The resulting tendency to form a shrinkage void in the center of the object during polymerizaion is overcome by the supply of polymerization material into the shrinkage cavity under the influence of the centrifugal force acting upon the material in the feed channel.

The volume of polymerization mixture supplied preferably exceeds the mould volume by at least 10 percent, but does not exceed the total volume of the mould and feed channel. Thus if the polymerization shrinkage normally amounts to not more than 10 percent, which can be expected with lactams, the mould will then always be completely filled upon completion of the polymerization, any excess material being present exclusively in the feed channel. Upon completion of the polymerization, the moulded object may easily be removed from the mould together with a short sprue, which is removed at a later stage.

From experience in metal rotating-casting techniques in which the molten metal is introduced into a rotating drum of lower temperature than the melting point of the material, it would have been reasonable to expect by one in the art, taken into account the fact the temperature of the mould considerably exceeds, preferably by at least 50° C., the melting point of the material supplied, that sealing troubles would arise when the monomer, which has the approximate viscosity of water at the elevated temperature, is subjected to large centrifugal forces in the mould. It has surprisingly been found however that there is in fact no appreciable leakage of the polymerization material along sealing faces. This may be due to the fact that as soon as the monomer penetrates between the said faces, the thin liquid layer present between two heated wall sections immediately polymerizes and as a result hermetically seals off the gap between the faces.

The present invention will be further described with reference to the accompanying drawings and the following example.

Figure 1:
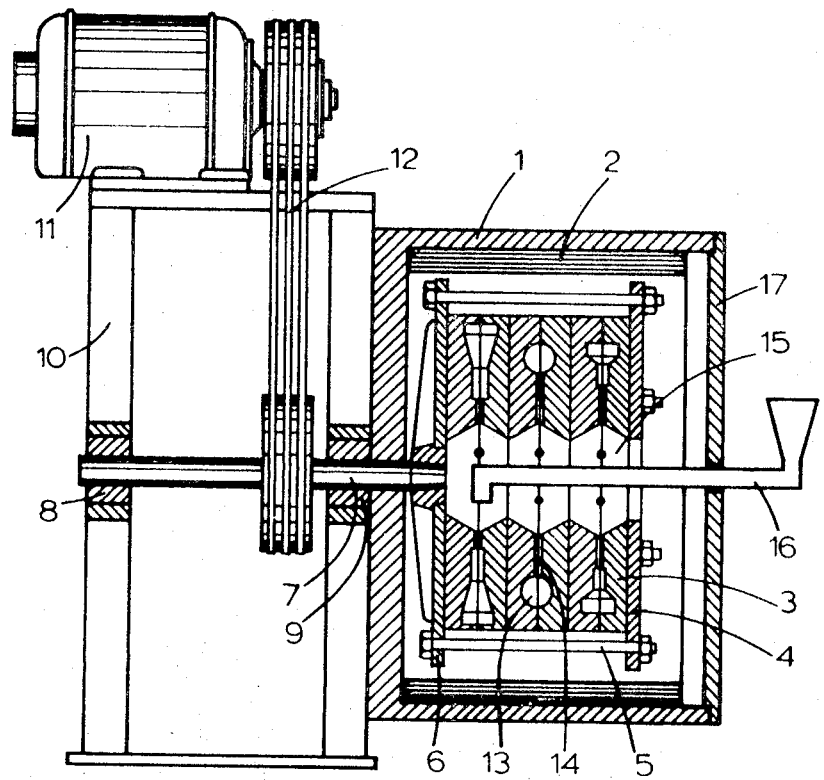
FIG. 1 is a longitudinal section through apparatus according to the invention.

Referring to FIG. 1, a furnace 1, adjustable so as to provide the required temperature by means of electrical heating elements 2, contains a number of molds 3. The molds are fitted on a rotating disc 6 carried on the end of shaft 7 by means of clamp plates 4 and bolts 5.

The shaft 7 is mounted externally of the furnace on bearings 8 and 9 mounted in frame 10. The shaft is driven by an electric motor 11 via a belt transmission 12. A number of molds is arranged side by side parallel to the axis of rotation, each of the molds consisting of two halves enclosing mold cavities 13, the jointing faces of the mold halves being disposed perpendicular to the axis of rotation of the molds. The said mold cavities 13 connect with the central feed chamber 15 by radial feed channels 14 and are uniformly distributed so that the apparatus is balanced during rotation.

Polymerization mixture is supplied to feed chamber 15 through a feed tube 16 passing through furnace cover 17 and co-axial with the axis of rotation thereof. The feed chamber 15 is divided into a number of biconical sections, each section having its widest diameter near the inlet of one of the connecting feed channels 14. Feed tube 16 is axially slideable in cover 17 so that during rotation of the furnace each of the cavities can receive an amount of polymerization mixture depending on the volume of the mold cavity and the feed channels.

Figure 2:
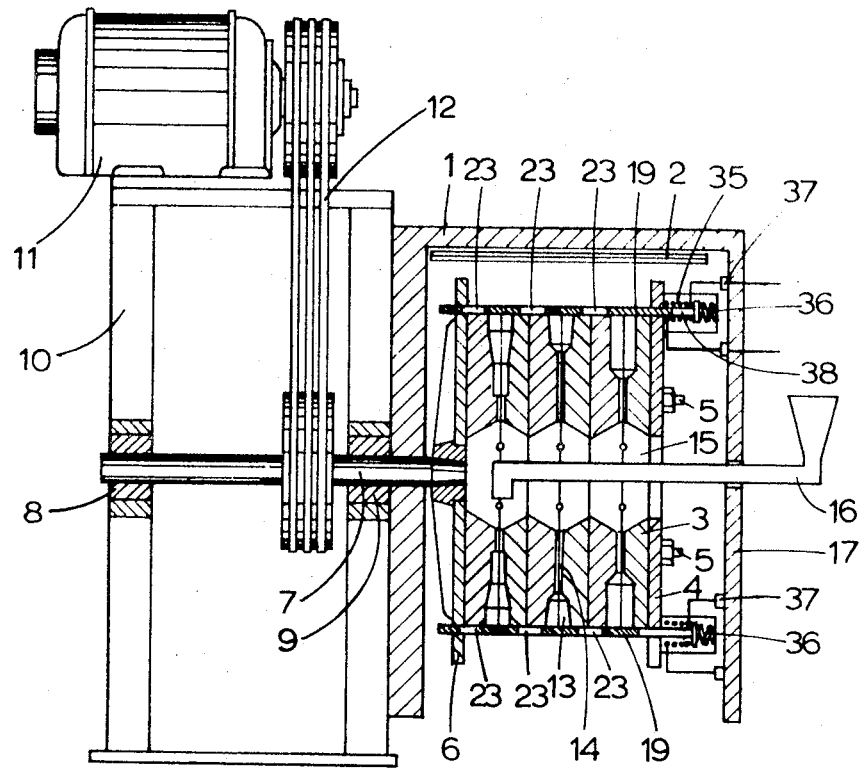
FIG. 2 is a cross sectional elevation of one embodiment of apparatus according to the present invention.

The molds 3 are open-bottomed and each is provided with an openable cover shown in the figures of the drawings as a rectangular plate 19. As can be seen in FIG. 2, the rectangular plates 19 are slideable in grooves 20 formed in the molds 3. The grooves 20 also hold the slideable plates 19 in place during the rotation of the molds 3. The plates 19 are slideable in a direction parallel to the axis of rotation of the molds 3. The cover plates 19 are provided with a plurality of oepnings 23 of such size and arranged in such a manner so that when the plate 19 is moved in an axial direction the openings 23 come into registration with the bottom of mold cavities 13, thus opening the bottom of mold cavity 13. The plate 19 can then be moved back so that the openings no longer are registerable with the bottom of mold cavities 13 and the plate 19 thus forms the bottom face of mold cavity 13.

Several means for sliding the cover plate 19 can be used. In FIG. 2 there is shown an electro-magnet relay comprising a magnetic filed inducing coil 35 which when energized through slide contact 37 urges the plunger 38, which is integrally connected to cover plate 19, towards coil spring 36. When the coil 35 is deenergized, the coil spring 36 moves the cover plate 19 back to its original position.

Figure 4:
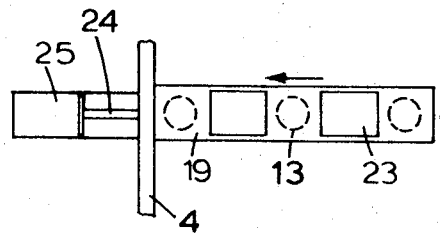
FIGS. 4, 5, 6, 7 and 8 are schematic diagrams demonstrating several alternative modes of moving the cover plates of the molds of FIGS. 1 and 2.

Alternative means for moving the cover plate 19 are shown in FIGS. 4 through 8. In FIG. 4, the cover plate 19 is moved by a piston 24 and cylinder mechanism 25. The hydraulic medium used to activate mechanism 25 is supplied through a central bore in the drive shaft of the apparatus shown in FIG. 1 nnd then through a distribution system in clamp plates 4 to the mechanism 25.

Figure 5:
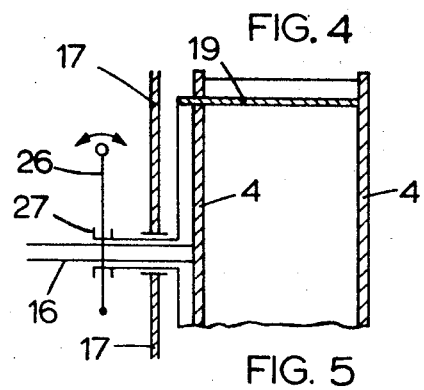

In FIG. 5, the cover plate 19 is moved mechanically. A shifting mechanism 27 as is commonly used in actuating friction clutches is attached to cover plate 19 and extends through furnace cover 17, axially arranged around the feed tube 16. The mechanism 27 is moved back and forth by the lever arm 26.

Figure 6:
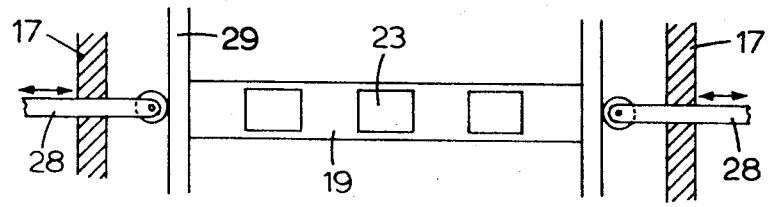

In FIG. 6, a pair of wheeled pushers 28 are actuacted from outside the furnace cover 17 to push the connecting ring 29 in the desired direction and thus move cover plate 19 which is integrally attached to the connecting ring.

Figure 7:
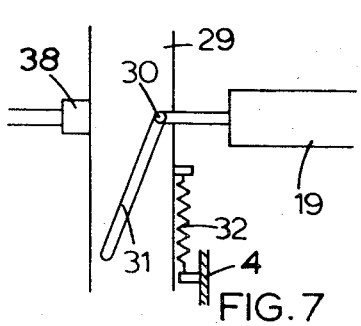

In FIG. 7, there is shown a modification of the apparatus of FIG. 6, wherein the connecting ring 29 is slotted. The ring 29 rotates with the molds and is connected to the mold clamp plates 4 by a plurality of springs 32. The slotted ring 29 can be made to rotate relative to the mold by braking mechanism 38. Cover plate 19 is provided with a prolongation which engages with pin 30 in a slot 31 of ring 29. When the braking mechanism 38 is actuated the ring 29 moves relative to the molds and pin 30 slides in slot 31 simultaneously moving cover plate 19 to its open position. When the braking mechanism is deactivated, springs 32 cause ring 29 to rotate back to its original position relative to the molds and thus, cover plate 19 moves back to its closed position.

Figure 8:
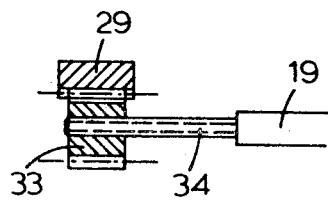

Instead of the slot and pin as shown in FIG. 7, a nut and screw mechanism can be used as shown in FIG. 8. In this modification, the ring 29 is provided with teeth on its inner side which engage teeth on the outer periphery of nut 33. As the ring 29 moves relative to the mold (produced by the braking mechanism as in the apparatus of FIG. 7), nut 33 rotates relative to ring 29 and thus, moves cover plate 19 from its closed position to its open position and back to its closed position by means of bolt 34 screwed in nut 33.

Figure 3:
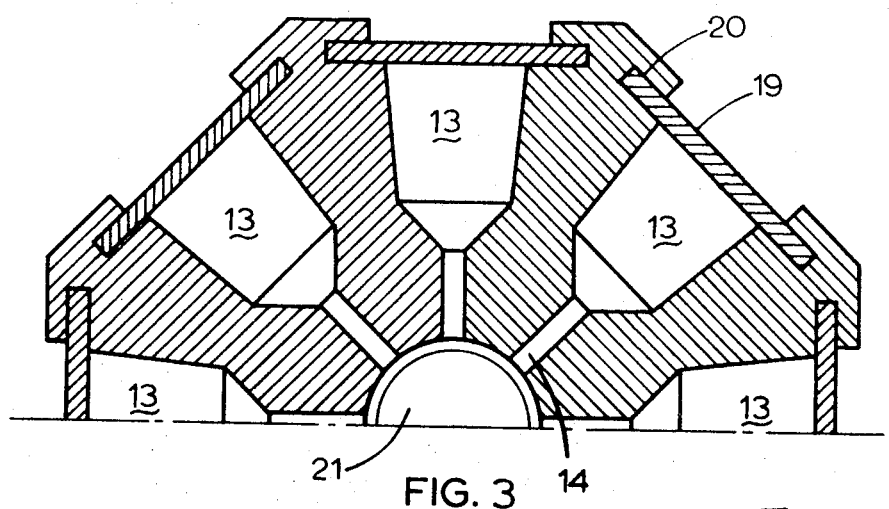
FIG. 3 is a partial cross section end view of the mold members of FIG. 1.

As shown in FIG. 3, the width of mold cavity 13 must increase towards the outer periphery of the mold to allow the molded objects to be released from the mold when the cover plate 19 is opened. The molded objects are thrown out of the mold cavities 13 by centrifugal force and collected at the bottom of the furnace, from where they are removed.

The following example of the apparatus and process of one preferred embodiment of the present invention is provided.

EXAMPLE

A suitable polymerization mixture was prepared by adding from 0.1 to 2 mole-percent potassium caprolactam calyst and from 0.05 to 2 mole-percent dicaprolactim ether to g-caprolactam. The resulting liquid reaction mixture was heated to 150° C. A portion of the reaction mixture was fed to a first set of eight rotating molds having the cover plates 19 in the closed position as shown in the apparatus according to FIG. 2. The set of eight molds had a total volume of 1,000 cc. and the feed channels associated with this set of molds had a total volume of 200 cc. Approximately 1,200 cc. of reaction mixture was fed to this set of molds through feed tube 16, and subsequently the feed tube was shifted and the other two sets of molds were filled with a like amount of reaction mixture. The molds were heated and held at 175° C and rotated at a rate of 300 rev./minute. The average distance between the mold and the axis of rotation was 20 cm., so that a centrifugal acceleration of about 200 m/sec$^2$ or about 20 times the acceleration of gravity was generated.

After about 5 minutes, the polymerization reaction inside the molds was completed and the cover plates 19 moved to their open position. The shaped articles were thrown out of the mold cavities, after which the cover plates 19 were returned to their closed positions and the mold cavities once again were filled with a mixture of the above reactants.

The molded objects from several such cycles were collected at the bottom of the furnace and did not show any air inclusions or shrinkage cavities and their surfaces had not been discolored by air oxidation. All the molded objects, of the same shape, were found to possess the same dimensions.

From the above example, it can be seen that the monomer is introduced into the molds at a temperature somewhat lower than the melting temperature of the polymer being formed and higher than the melting temperature of the monomer. In the example, caprolactam monomer having a melting point about 156° F. was introduced into the molds at a temperature somewhat below the melting temperature of polycaprolactam (about 410° F.). As the monomer polymerizes it also solidifies without the necessity of cooling the mold. The molds are held constantly at the temperature of the caprolactam feed or somewhat higher but less than the temperature of the melting point of the polymer being formed. The molds are kept in constant rotary motion and need not be stopped after forming each set of molded articles.

The process according to the invention is particularly suited for the series production of molded nylon articles, such as for example gearwheels. However, the invention can be employed in the polymerization of cyclic amides, such as for example butyrolactam, valerolactam, caprolactam, oenantholactam, capryllactam, decanolactam, undecanolactam, laurinolactam, pentadecanolactam, hexadecanolactam, methyl caprolactam, cyclic hexamethylene adipamide and mixtures thereof, in the presence of an ionogenic catalyst, such as for example lactammetal compounds containing a metal atom which is bound to the lactam-nitrogen atom, e.g., sodium caprolactam, and potassium caprolactam. The lactam-metal compound may conveniently correpond to the lactam being polymerized. In these polymerization processes, use can be made of substances which react with the lactam to form such lactam-metal compounds, e.g., metal-alkyl compounds, such as for example diisobutyl aluminium hydride, triethyl aluminium, triisopropyl aluminium, diethyl zinc and compounds of these metals giving an alkaline reaction, such as for example hydrides, oxides, hydroxides, alcoholates and carbonates, and also Grignard compounds, such as alkyl magnesium bromide and aryl magnesium bromide.

Nitrogen compounds, such as isocyanates, carbodiimides, cyanamides and in general compounds having a tertiary nitrogen atom which is bound to carbonyl, thiocarbonyl, sulphonyl or nitroso groups, and also diimide ethers, such as dicaprolactim ether, can be used as the promoter.

Fillers such as anti-oxidants, UV-stabilizers, pigments, dyes, glass or textile fibers, coated or uncoated and inorganic auxiliary materials, may be added to the reaction liquid. It is furthermore possible successively to charge the mold with different lactams, which may, if so desired, be mixed with fillers particularly if it is required that the properties of the material at the surface of the object differ from those at the core.

Generally, the liquid lactam to be polymerized will contain from about 0.1 to 2.0 percent by weight of the catalyst and about 0.01 to 3.0 percent by weight of a promoter, as is known to the art. The mold wall temperature is, as mentioned above, held constant at generally about 130° to 180° C., preferably about 150° to 160° C. The polymerization is conveniently conducted at atmospheric pressure although higher or lower pressures may be used as desired.

The rotational speed of the mold should be such that the resultant centrifugal force exerted upon the material to be polymerized is greater than the force of gravity, preferably at least five times the force of gravity, and most preferably the centrifugal force caused by the mold rotation is at least 10 times the force of gravity acting upon the lactam.

What is claimed is:

1. In a process for the manufacture of high molecular weight, polymerized, molded objects by ionogenic catalytic polymerization of lactams, wherein at least one lactam monomer, mixed with a catalyst and promoter for accelerating the polymerization, in the liquid state, is introduced into a heated mold in which the polymerization occurs, the improvement comprising using a mold having a width which increases toward the outer periphery of the mold and rapidly rotating the mold on an axis outside the mold, introducing the lactam to be polymerized into said mold at a position on said mold nearest said axis, said mold being rotated at such a speed that the resultant centrifugal force exerted upon the lactam to be polymerized is greater than the force of gravity, polymerizing said lactam in said rotating molds and removing said molded objects by opening the outer periphery of said mold thereby permitting the molded object to be thrown in a radical direction from the mold cavity by centrifugal force.

2. A process as claimed in claim 1 wherein the lactam to be polymerized is introduced into said mold via a conduit disposed co-axially with respect to said axis, and via a feed channel which extends from the conduit at an angle to the axis.

3. The process as claimed in claim 1, wherein the rotation speed of said mold is such that the resultant centrifugal force exerted upon the lactam to be polymerized is at least five times the force of gravity.

4. The process as claimed in claim 1, wherein the rotation speed of said mold is such that the resultant centrifugal force excerted upon the lactam to be polymerized is at least 10 times the force of gravity.

5. The process as claimed in claim 1, wherein the lactam to be polymerized is supplied at a temperature which is lower than the temperature of the wall of the mold.

6. The process as claimed in claim 1, wherein the temperature of the lactam to be polymerized is at least 20° C. less than the temperature of the wall of the mold.

* * * * *